Figure 1:
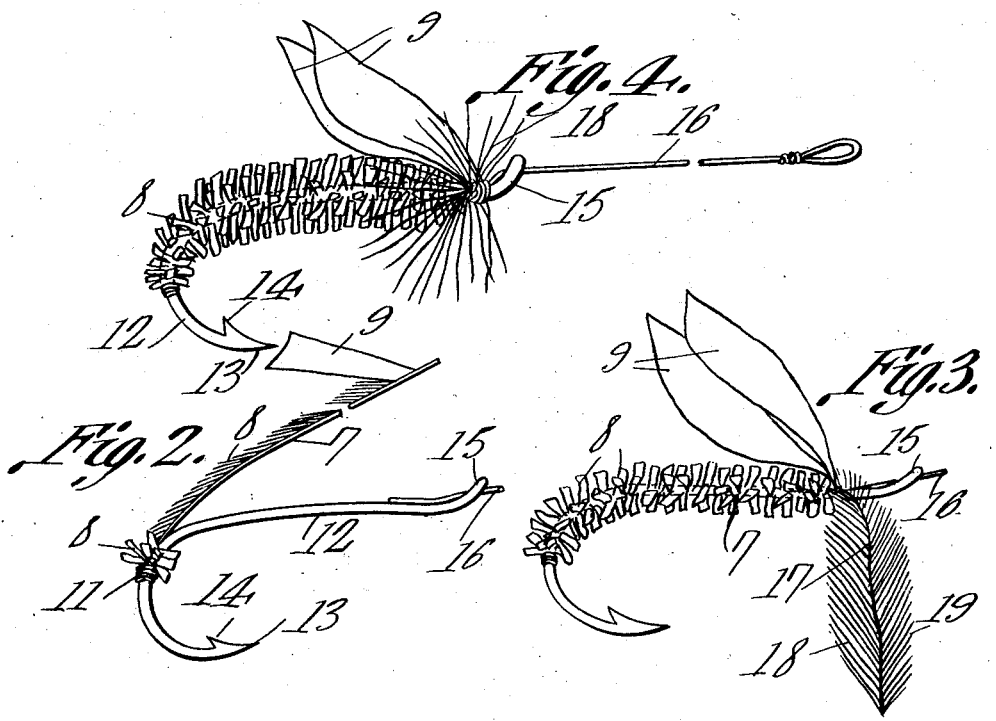
Figure 1:
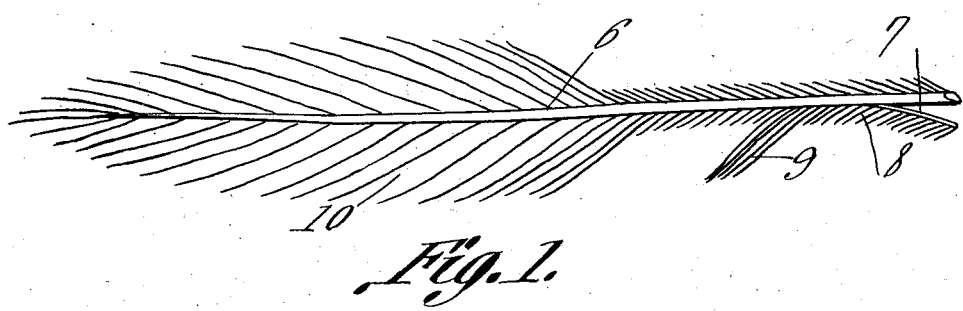

A. WINNIE.
ARTIFICIAL FISHING BAIT.
APPLICATION FILED JULY 5, 1911.

1,009,363.

Patented Nov. 21, 1911.

Witnesses

Albert Winnie, Inventor by C. A. Snow & Co., Attorneys

UNITED STATES PATENT OFFICE.

ALBERT WINNIE, OF TRAVERSE CITY, MICHIGAN.

ARTIFICIAL FISHING-BAIT.

1,009,363.  Specification of Letters Patent.  Patented Nov. 21, 1911.

Application filed July 5, 1911. Serial No. 636,838.

*To all whom it may concern:*

Be it known that I, ALBERT WINNIE, a citizen of the United States, residing at Traverse City, in the county of Grand Traverse and State of Michigan, have invented a new and useful Artificial Fishing-Bait, of which the following is a specification.

This invention relates to artificial fishing bait and particularly to fly hooks and has for its object to provide for an improved method of forming such fly hooks.

Heretofore these flies have been made of woolen, silk or other similar fibers which have a short life in use, whereas I employ a feather or feathers of suitable hue and variety cut to novel form and then applied to the hook proper in a novel manner to form a very close imitation of the bait desired.

The method of forming the improved fly hook comprises in cutting or stripping the outer ends or greater portion of the laminae or barbs from the shaft or rachis of the feather leaving short stubs thereof to form the body of the bait and where wings or similar parts are to be formed a portion of the laminæ or barbs are left whole. The said stubs and barbs are removed with an aftershaft from the rachis or shaft and the aftershaft is wound around the shank of the hook proper, the stubs forming the body of the bait and the barbs forming the wings and the said after shaft is secured to the said shank of the hook proper in a suitable manner. Thus the whole fly is made of one piece and is practically indestructible when made in the manner described of a suitable feather. Novel means are also provided for making the feelers of insects or other artificial bait, the bodies of which have been patterned in the manner described. This method can be employed to make innumerable artificial insects, bugs and other bait, such as hellgramites, spiders, grass hoppers, crickets and the like which are used for bait both in deep fishing and dry or surface fishing.

It would be difficult to attempt to enumerate the various applications of this invention but with the hereinafter description of one form of fly hook it will be apparent to those skilled in the art that the use of the feathers along the method described has a wide range.

This invention is illustrated in the accompanying drawings, in which similar reference characters indicate similar parts, and in which:—

Figure 1 is an elevation of a feather partially stripped. Fig. 2 is a side elevation showing the first step of applying the after shaft to the shank of the hook proper. Fig. 3 is a similar view showing the body and wings of the bait formed on the hook proper and showing the first step of applying the feelers thereto. Fig. 4 illustrates the completed fly and ready for use.

Referring specifically to the drawings, 12 designates the shank of the hook proper; 15, the eyelet; 16, the snell; 13, the point of the hook proper; and 14, the barb of the hook proper.

The feathers which are employed to form the bait are secured from any suitable variety of bird, and as shown in Fig. 1 the feather comprises a shaft or rachis 13, having vanes implanted therein comprising slender laminæ or barbs, the vanes or webs being indicated at 10.

In preparing the feather for application to the hook proper the barbs of the vanes are first clipped off close to the shaft 6 to leave the stubs 8 thereon and when it is desired to form wings on the bait a portion of the barbs are left whole and shown at 9. The after shaft 11 is then removed from the shaft 6 carrying with it the stubs 8 and barbs 9.

In applying the after shaft to the hook proper one end thereof is secured to the shank 12 of the hook proper near the point thereof as shown at 11, and it is wound spirally around the shank toward the eye 15. After being wound around the shank 12 of the hook proper it causes the stubs to project radially from the shank 12 to form the body of the insect. The barbs 9 are arranged to project upwardly and rearwardly to form the wings of the insect. The other end of the after shaft 7 is then secured to the shaft 12 of the hook proper to secure the after shaft rigidly thereon. It will thus be seen that the body and wings of the insect are formed rigidly on the shank of the hook proper and are formed from one strip of material.

When it is desired to form feelers for the insect a comparatively fine feather 19 is secured at its tip or at the outer end of the shaft 15 thereof to the shank 12 of the hook proper, preferably at the front end of the body of the insect, and is wound around the shank causing the barbs 18 thereof to project outwardly therefrom in various directions to imitate the feelers of the real insect which is being imitated. This shaft 17 of the feather 19 is secured to the shank 12 of the hook proper in any suitable manner.

It has been found in actual practice that the stubs 8 being close to the shaft of the feather are of a proper hue to imitate the body of the insect and that the barbs 9 of the feather are of a proper color to imitate the wings of the insect, it being understood that various feathers can be employed to imitate various insects.

By means of the stripped feathers various forms of baits can be formed on various hooks for fishing, such as double and triple hooks, double spinners, fly spinners, and hooks for sinker use and the like. The bait being made of feathers becomes readily soaked with water to render it soft for fishing and when used for dry or surface bait readily gives up its moisture when lifted from the water. When silk or other fibers are used to form the bait the same tend to retain the moisture and it is thus difficult to dry them rapidly for surface fishing and they are therefore objectionable for this purpose. The body of the insect so formed is practically indestructible and holds its shape well. With the same strip of feather or after shaft it is also possible to form the legs of an insect being imitated as well as the body and wings.

What is claimed is:—

1. A method of forming an artificial bait from a feather consisting in cutting the ends of the barbs from the feather and leaving a portion of the barbs whole and winding the after shaft about a member to cause the studs to project therefrom to form the body and the whole barbs to form the wings of the artificial bait.

2. In an artificial bait, the combination with a shank, of an after shaft of a feather having a portion of its barbs removed therefrom to form stubs and whole barbs thereon, which after shaft is wound around the said shank.

3. In an artificial bait, the combination with a shank, of an after shaft of a feather having a portion of the barbs removed therefrom to form stubs and whole barbs thereon, which after shaft is wound around the said shank, the stubs forming the body of the bait and the whole barbs forming the wings thereof, and a fine feather wound around the said shank to form the feelers of the bait.

In testimony that I claim the foregoing as my own, I have hereto affixed my signature in the presence of two witnesses.

ALBERT WINNIE.

Witnesses:
 EDWARD C. MADARY,
 FRANK SULLIVAN.

Copies of this patent may be obtained for five cents each, by addressing the "Commissioner of Patents, Washington, D. C."